June 20, 1967  A. L. BABSON  3,326,777
PROCESS FOR DIFFERENTIATING THE ISO-ENZYMES
OF LACTIC DEHYDROGENASE
Filed Dec. 10, 1964
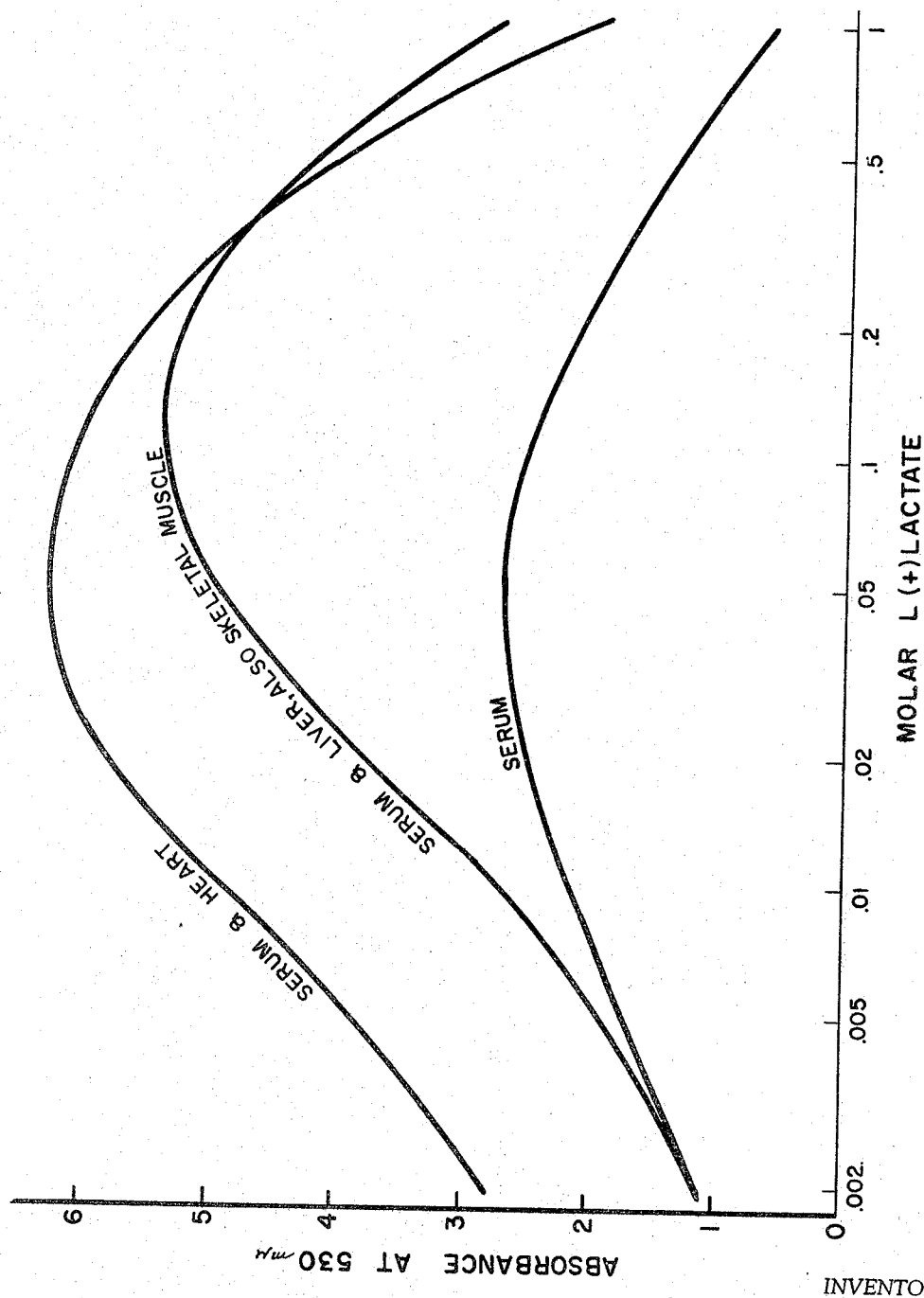
INVENTOR
ARTHUR L. BABSON
BY *Albert H. Graddis*
ATTORNEY 3,326,777
PROCESS FOR DIFFERENTIATING THE ISO-
ENZYMES OF LACTIC DEHYDROGENASE
Arthur L. Babson, Morris Plains, N.J., assignor to War-
ner-Lambert Pharmaceutical Company, Morris Plains,
N.J., a corporation of Delaware
Filed Dec. 10, 1964, Ser. No. 417,439
6 Claims. (Cl. 195—103.5)

This invention relates to a novel diagnostic process and more particularly relates to a new and novel process for the rapid and accurate determination as well as the rapid and accurate differentiation of the tissue of origin of lactic dehydrogenase in body fluids.

This invention also includes within its scope new and novel substrates useful in the above diagnostic process.

Lactic dehydrogenase is an enzyme found in most mammalian tissues and it catalyzes the conversion of L-lactic acid to pyruvic acid in the presence of nicotinamide adenine dinucleotide. The latter is also known as co-enzyme I, cozymase and diphosphopyridine nucleotide, for example, but for simplicity will be referred hereinafter as NAD which in reduced form can be referred to conveniently as $NADH_2$. This reaction may be represented by the equation:

$$L(+)\text{lactic acid} + NAD \rightleftharpoons \text{pyruvic acid} + NADH_2$$

The enzyme has been found to consist of five different subunits or iso-enzymes, the relative concentrations of which vary markedly with the tissue of origin. Each of these iso-enzymes may be identified by their electrophoretic mobility. Thus, lactic dehydrogenase isolated from cardiac muscle, although catalyzing the same reaction, has a different iso-enzyme pattern from that isolated from skeletal muscle. While in a healthy human, these iso-enzymes are, for the most part, confined within the tissues, during abnormal growth of tissues to form tumors or in leukemia or other diseases such as myocardial infraction and hepatitis, for example, they are found to be present in the serum in appreciable concentration. It has been postulated that the passage of an enzyme into serum from an abnormal tissue of origin may be due to an excessive production of the enzyme by the abnormal tissues or to changes in the permeability of the abnormal cells resulting in enzyme leakage into extra-cellular fluid and thence into general circulation. Accordingly, the determination of the level of serum lactic dehydrogenase provides valuable information to the clinician in the diagnosis of various diseases. Due to the difficulty of pinpointing with certainty the tissue of origin of the enzyme, much of the value in the differential diagnosis of diseases which cause elevations in serum lactic dehydrogenase is lost.

Thus, for example, Vessel et al. report in Ann. New York Acad. Sc. 75:286–291 (1958) that they have studied the problem of the origin of serum lactic dehydrogenase by electrophoretic methods. They show that at least four distinct serum fractions contain lactic dehydrogenase activity. Efforts to further identify the tissue of origin of these different iso-enzymes are generally based on the use of gel electrophoresis followed by the staining of the iso-enzymes by histo-chemical techniques or elution, such as that described by Yakulis in The American Journal of Clinical Pathology, vol. 38, No. 4, pages 378–82. This is a long and time-consuming process which obviously is not practical as a routine clinical procedure or in a small clinic or clinical laboratory where only few skilled technicians are available.

From the foregoing, it is immediately apparent that there is a need for a simple yet accurate method for identifying the tissue of origin of serum lactic dehydrogenase.

Accordingly, a primary object of this invention is to provide a simple, accurate as well as rapid method for determining and differentiating the tissue of origin of serum lactic dehydrogenase.

Another object of this invention is to provide a process for identifying the tissue of origin of serum lactic dehydrogenase by simple chemical means.

Yet another object of this invention is to provide a composition which may be employed in the procedure provided for the differentiation of the tissue of origin of serum lactic dehydrogenase.

Other objects and advantages of this invention will become more apparent from the following detailed description and the accompanying drawing.

According to this invention the differentiation of the tissue of origin of serum lactic dehydrogenase is based upon the discovery that the activity of each of the iso-enzymes comprising lactic dehydrogenase is observed to be markedly different at different concentrations of lactic acid in the substrate. For example, lactic dehydrogenase of cardiac muscle tissue origin is at maximum activity in a substrate of about 0.01 to 0.2 molar L(+) lactate concentration whereas the lactic dehydrogenase of liver tissue origin is most active in a substrate of 0.05 to 0.5 molar L(+) lactate concentration.

These ranges of activity are shown in the accompanying drawing which also indicates from the activity curves shown therein the concentration of maximum activity. These curves are obtained by plotting optical absorbance at 530 mµ against a substrate containing 0.002 to 1.0 molar L(+) lactic. The samples are obtained by extracting human heart, liver or skeletal muscle at autopsy with an aqueous solvent since the enzyme is richest at its source of origin. The resulting extracts are then added to pooled human serum and incubated with the lactate. Thus in the drawing "serum & heart" refers to an extract of heart added to pooled human serum and the resulting optical density produced with various concentrations of the lactate substrate. On the other hand, "serum" refers to "pooled human serum" with no added extracts and serves as a control.

Referring more specifically to the drawing, it becomes apparent that the lactic dehydrogenase enzyme from cardiac muscle, for example, is most active in a substrate of 0.05 molar L(+) lactate concentration and that from liver in a substrate of 0.20 molar L(+) lactate concentration. In addition, and as brought out by the activity curves which constitute the drawing, serum lactic dehydrogenase from cardiac muscle is more active at very low concentrations of L(+) lactate than is that of liver origin but is more inhibited by high concentrations of L(+) lactate. Skeletal muscle lactic dehydrogenase yields an activity curve similar to liver particularly at the lower and higher L(+) lactate concentrations. This suggests that a differential diagnosis may be made through serum lactic dehydrogenase activity determinations to ascertain whether its origin is due to heart, liver or skeletal muscle involvement. Thus, when serum lactic dehydrogenase is found to be elevated a determination of the ratio of lactic dehydrogenase activity in the presence of a high concentration of L(+) lactate to enzymatic activity at a low concentration of L(+) lactate can be made to provide this important information.

Thus, in a typical situation where such a differential determination is to be effected in accordance with the method of this invention total LDH is determined by incubating 0.05–0.2 ml. of patient's serum or other body fluid such as spinal fluid at 37° C. with an aqueous solution container 0.2 molar L(+) lactate, a buffer such as tris-hydroxymethylaminoethane which is designated to maintain the pH of the substrate at about 8 to 9, a small amount of nicotinamide adenine dinucleotide, a suitable chromogenic electron acceptor which acts as an indicator such as iodonitrotetrazolium chloride (INT) or nitro-blue tetrazolium and an intermediate electron carrier such as phenazine methosulfate. For a description of the intermediate electron carrier see the article in Analytical Biochemistry, 1, 317–326 (1960), entitled "The Determination of Lactic Dehydrogenase with a Tetrazolium Salt" by M. M. Nachlas, S. I. Margulies, J. D. Goldberg, and A. M. Seligman. The chromogenic electron acceptor indicator exists in colorless form in its oxidized state and becomes colored when in a reduced state. For instance, INT becomes red when it is reduced. The resulting mixture is then incubated for 5 minutes at 37° C. after which the reaction is stopped by the addition of an acid such as, for example, 0.1 N aqueous hydrochloric acid. The optical density is then determined at a wave length of 530 m$\mu$ in a suitable colorimeter. The intensity of the color produced is proportional to the lactic acid dehydrogenase present in the body fluid being tested. The optical density thus obtained is then compared with that produced by a control sample.

The control is prepared by incubating a sample of the body fluid with potassium oxalate with or another suitable oxalate in place of the lactate and with disodium ethylene diamine tetraacetic acid (EDTA). The oxalate ion inhibits any lactic dehydrogenase activity and the EDTA prevents the precipitation of any calcium oxalate formed thereby providing a blank with all the ingredients except enzyme activity for optical comparison. If the comparison of the optical density of the sample to the control indicates the presence of elevated lactic dehydrogenase, this assay procedure is repeated in analogous fashion but in parallel employing a divided sample in which one substrate contains a high concentration of lactate and the other a lower concentration of lactate. Thus, for example, 1.0 molar L-lactate solution may be employed as the substrate for one determination while a 0.01 molar L-lactate solution may be employed as the substrate for the other. The assay procedures are then carried out as described, and the optical densities are determined. Since the enzyme will have different substrate optima activities depending on its origin, the origin may be readily determined by comparing the optical densities produced.

It is frequently advantageous also to include a surface active agent in the substrate to stabilize the color formed. Surface active agents such as polysorbate 80, albumin or ethoxylated fatty alcohols in the amount of from 0.005 to 0.5% by weight of the substrate may be added.

In the above-described process, the L(+) lactate employed may be, for example, sodium lactate, potassium lactate, calcium lactate and the like. If the substrate is a racemic mixture of dl-lactate, an 0.2 molar solution is employed.

In order to further illustrate the practice of this invention, the following example is given:

*Example*

The various reagents employed in the determination of tissue of origin of lactic dehydrogenase are prepared as follows:

1. The color reagent is prepared by dissolving 50 mg. of INT in about 15 ml. of water with constant stirring if necessary to facilitate dissolution. To this solution 125 mg. of NAD and 12.5 mg. of phenazine methosulfate are added. The resulting solution is made up to a final volume of 25 ml. with more water in a volumetric flask. Since this reagent is sensitive to light it is protected from light at all times to avoid decomposition.

2. The buffer reagent is prepared by dissolving 1.0 g. of ethoxylated oleyl alcohol (Lipal 10-0A, Drew Chemical Co., Boonton, New Jersey) in 10 ml. of water by heating to about 95° C. This is diluted to about 50 ml. with water and to this is added 12.1 g. of tris-hydroxymethylaminomethane. The pH of this solution is then adjusted to 8.2 with 3 N HCl and diluted to a final volume of 100 ml. with more water.

3. The substrate of the lactate to give a final concentration of about 0.1 M is prepared by dissolving 5.0 ml. of a 20% solution of lactic acid in about 50 ml. water. This is adjusted to a pH 5.5 with 1 N sodium hydroxide and diluted to 120 ml. with water. The substrate is stored under refrigeration in the presence of a few drops of chloroform.

4. The control reagent is prepared by dissolving 0.2 g. potassium oxylate and 0.2 g. ethylene diamine tetraacetic acid, disodium dihydrate in 100 ml. of water. The procedure for determining the enzyme concentration is as follows:

0.1 ml. of the patient's serum or other body fluid is pipetted into each of two test tubes containing 0.2 ml. of the buffer reagent. 0.5 ml. of the substrate is added to one tube and 0.5 ml. of the control reagent to the other. After thoroughly mixing each of these two tubes, they are incubated at 37° C. At precisely timed intervals 0.2 ml. of the color reagent is added and they are allowed to be incubated together for an additional 5 minutes at 37° C. After the 5 minutes incubation period 5 ml. of 0.1 HCl acid is added with thorough mixing. The difference in absorbance between the control and the patient's serum sample is determined at 500 to 540 m$\mu$. Reference standards containing known amounts of LDH are treated as patient's serum and a standard curve relating the LDH activity to optical density is constructed. The activity of patient's serum is determined by reference to said standard curve. It has been found that color produced is linear with enzyme concentration. If this assay indicates the presence of elevated LDH, the above test procedure is repeated using in one instance a high concentration of lactate and in the second instance a lower concentration of lactate as the substrates.

It is understood that the foregoing detailed description is given merely by way of illustration and that many variations may be made therein without departing from the spirit of my invention.

Having described my invention, what I desire to secure by Letters Patent is:

1. A process for differentiating heart, lactic dehydrogenase from liver and skeletal muscle lactic dehydrogenase in a body fluid which comprises the steps of measuring the activity of said enzyme in a substrate containing about 0.5 molar to 2 molar L(+)lactate and comparing the activity thus produced with that produced by said enzyme in a substrate containing about 0.05 molar to 0.002 molar of L(+) lactate.

2. A process for differentiating heart, lactic dehydrogenase from liver and skeletal muscle lactic dehydrogenase in a body fluid which comprises the steps of measuring the activity of said enzyme in a substrate containing about 1 molar of L(+) lactate and comparing the activity thus produced with that produced by said enzyme in a substrate containing about 0.01 molar of L(+)lactate.

3. A process for differentiating heart, lactic dehydrogenase from liver and skeletal muscle lactic dehydrogenase in a body fluid which comprises the steps of measuring the activity of said enzyme in a substrate having a pH of 8 to 9 containing about 1 molar of L(+) lactate in combination with small amounts of nicotinamide adenine dinucleotide, a chromogenic electron acceptor, an intermediate electron carrier and a surface active agent and comparing the optical density thus produced with that produced by said enzyme in a substrate having a pH of 8 to 9 containing about 0.01 molar of L(+) lactate in combination with small amounts of nicotinamide adenine dinucleotide, a chromogenic electron acceptor indicator, an intermediate electron carrier and a surface active agent.

4. Process in accordance with claim 3 wherein said surface active agent is a member of the group consisting of egg albumin, polysorbate 80 and ethoxylated alcohol.

5. Process in accordance with claim 3 wherein said electron carrier is phenazine methosulfate.

6. Process in accordance with claim 3 wherein said chromogenic electron acceptor is a member of the group consisting of iodonitrotetrazolium chloride and nitro-blue tetrazolium.

References Cited

Wilkinson, An Introduction to Diagnostic Enzymology, pp. 154–157, 1962.

A. LOUIS MONACELL, *Primary Examiner.*

ALVIN E. TANENHOLTZ, *Examiner.*